United States Patent [19]

Shinozaki et al.

[11] Patent Number: 4,762,633

[45] Date of Patent: Aug. 9, 1988

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corporation, Tokyo, Japan

[21] Appl. No.: 26,749

[22] Filed: Mar. 17, 1987

[30] Foreign Application Priority Data

Mar. 20, 1986 [JP] Japan ................................. 61-62794

[51] Int. Cl.$^4$ ............................................. H01G 9/00
[52] U.S. Cl. .................................... 252/62.2; 361/433
[58] Field of Search ..................... 252/62.2; 361/433 E

[56] References Cited

U.S. PATENT DOCUMENTS 3,138,746  6/1964  Burger et al. ...................... 252/62.2
4,046,652  9/1977  Pisterius et al. ..................... 204/78
4,541,037  9/1985  Ross et al. .......................... 252/62.2

Primary Examiner—John F. Niebling
Assistant Examiner—Kathryn Rubino

[57] ABSTRACT

An electrolyte for an electrolytic capacitor is disclosed containing a fluorocomplex acid salt of morpholine or a morpholine derivative as solute within an aprotic solvent. The electrolyte exhibits high conductivity while eliminating the undesirable side effects caused by the presence of water.

3 Claims, No Drawings

ELECTROLYTE FOR ELECTROLYTIC CAPACITOR

FIELD OF THE INVENTION

An electrolyte for an electrolytic capacitor containing within an aprotic solvent a fluorocomplex acid salt of morpholine or morpholine derivative as solute.

An electrolyte for an electrolytic capacitor according to the invention may conveniently be prepared by adding one equivalent amount of morpholine or morpholine derivative to an aqueous solution of fluorocomplex acid for reaction with subsequent vacuum drying to obtain an anhydrous salt and then dissolving said anhydrous salt to an aprotic solvent until a desired conductivity is obtained, for example, as an approximately 10% by weight solution.

BACKGROUND OF THE INVENTION

Hitherto, organic acids or its salts and glycol series pastes have been principally used as an electrolyte for electrolytic capacitor for general purposes. The latest expansion of utilization for the electronic instruments requires more improvement and advancement in the reliability and performance of the capacitor entailing solving the undesired problem of the presence of water in the paste, and as a result, an electrolyte using an aprotic solvent in place of organic acid and its salt, and glycol paste has become attractive.

The greatest subject of research of the aprotic solvent system electrolyte is how to obtain an electrolyte of high conductivity, and to achieve this, an organic carboxylic acid or its salt which is very soluble in the aprotic solvent and has a high degree of dissociation has been researched as a primary candidate but has not yet been successful. To solve the matter and obtain a high conductivity, a solvent which produces water resulted from the reaction between acids and alcohols or glycols and even water is incorporated into the aprotic solvent with still insufficient conductivity, increments of water and solute contents with poor reliability at the elevated temperature as disclosed in the Japanese patent publication Nos. 55-3989, 57-56763, 58-32769 and the U.S. Pat. No. 4,117,531.

After extensive research and studies to obtain an electrolyte which is substantially a nonaqueous system electrolyte and has a high conductivity with the use of an aprotic solvent but without using any solvent which forms water in reaction between acids and alcohols with glycols, it has been discovered that a fluorocomplex acid salt of morpholine or morpholine derivative has a high solubility in the aprotic solvent with an enhanced releasability and provide a high conductivity.

SUMMARY OF THE INVENTION

Thus, a principal object of the invention is to provide an electrolyte of a substantially non water series high conductivity with use of the aprotic solvent.

An electrolyte for an electrolytic capacitor according to the invention is characterized by containing a fluorocomplex acid salt of morpholine or morpholine derivative in the aprotic solvent as solute.

PREFERRED EMBODIMENTS OF THE INVENTION

The fluorocomplex acid salt of morpholine or morpholine derivative according to the invention is represented by the following general formula,

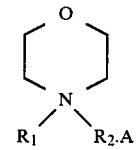

in which $R_1$ and $R_2$ are independently hydrogen atom, alkyl group having 1 to 8 carbon atoms and A is a fluorocomplex acid.

The morpholine derivative to be preferably used in the invention may be selected from the following but not limited thereto:

4-methylmorpholine, 4-ethylmorpholine, 4-octylmorpholine, 4,4-diethylmorpholinium.

The fluorocomplex acid to be used in the invention may be tetrafluoroboric acid ($HBF_4$) or hexafluorophosphoric acid ($HPF_6$).

The aprotic solvent to be used in the invention may be selected from the following but not limited thereto:

(1) Amide system solvent:
N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphorinamide (2) Oxide compounds:
dimethyl sulfoxide (3) Nitrile compounds:
acetonitrile (4) Cyclic esters, cyclic amides:
γ-butyrolactone, N-methyl-2-pyrrolidone, ethylene carbonate, propylene carbonate.

An electrolyte for an electrolytic capacitor according to the invention may conveniently be prepared by adding one equivalent amount of morpholine or morpholine derivative to an aqueous solution of fluorocomplex acid for reaction with subsequent vacuum drying to obtain an anhydrous salt and then dissolving said anhydrous salt to an aprotic solvent until a desired conductivity is obtained, for example, as an approximately 10% by weight solution.

(EXAMPLES 1 TO 6)

An electrolyte for an electrolytic capacitor according to the invention will be exemplified in the following with 10% by weight solution for fluorocomplex acid salt of various morpholine or morpholine derivatives with respect to the conductivity as shown in Table 1.

Further, as a comparative example the conventional standard electrolytes composed of 78% by weight of ethylene glycol, 10% by weight of water and 12% by weight of ammonium adipate are shown also in Table 1.

TABLE 1

| Example | Solute compound | Aprotic Solvent | Conductivity (ms/cm) |
|---|---|---|---|
| 1 | morpholine tetrafluoroborate | N,N—dimethylformamide | 17.9 |

TABLE 1-continued

| Example | Solute compound | Aprotic Solvent | Conductivity (ms/cm) |
|---|---|---|---|
| 2 | 4-methylmorpholine tetrafluoroborate | acetonitrile | 24.9 |
| 3 | 4,4-diethylmorpholinium tetrafluoroborate | propyline carbonate | 6.9 |
| 4 | morpholine hexafluorophosphate | γ-butyro-lactone | 9.0 |
| 5 | 4-methylmorpholine hexafluorophosphate | acetonitrile | 20.0 |
| 6 | 4,4-diethylmorpholinium hexafluorophosphate | N—methyl-formamide | 8.7 |
| Ref. | ethylene glycol water ammonium adipate | 78% by weight 10% by weight 12% by weight | 6.7 |

The high-temperature load test obtained at 16 WV 180 micro F for electrolytes exemplified in examples 1 to 6 and the comparative example are shown as the mean value of 10 load tests in Table 2.

TABLE 2

| | Initial Value | | | 110 deg. C. 1000 hours | | |
|---|---|---|---|---|---|---|
| Example | Capacity μF | tan δ | Leakage Current μA | Capacity μF | tan δ | Leakage Current μA |
| 1 | 181 | 0.050 | 0.58 | 168 | 0.066 | 0.51 |
| 2 | 183 | 0.030 | 0.56 | 167 | 0.042 | 0.52 |
| 3 | 178 | 0.079 | 0.61 | 162 | 0.119 | 0.56 |
| 4 | 178 | 0.075 | 0.63 | 173 | 0.087 | 0.59 |
| 5 | 182 | 0.044 | 0.60 | 166 | 0.062 | 0.55 |
| 6 | 179 | 0.074 | 0.57 | 168 | 0.096 | 0.54 |
| Ref. | 177 | 0.084 | 0.74 | 152 | 0.133 | 0.72 |

The electrolyte according to the invention may provide a non water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for an electrolytic capacitor comprising an aprotic solvent and a fluorocomplex acid salt of morpholine or morpholine derivative of general formula,

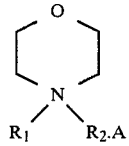

in which $R_1$ and $R_2$ are independently hydrogen atom, alkyl group having 1 to 8 carbon atoms and A is a fluorocomplex acid.

2. An electrolyte for an electrolytic capacitor according to claim 1, wherein the aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

3. An electrolyte for an electrolytic capacitor according to claim 1 or 2, wherein the fluorocomplex acid is tetrafluoroboric acid or hexafluorophosphoric acid.

* * * * *